(12) United States Patent
Yue

(10) Patent No.: US 8,053,703 B2
(45) Date of Patent: Nov. 8, 2011

(54) LASER CUTTING DEVICE

(75) Inventor: Guo-Han Yue, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 830 days.

(21) Appl. No.: 12/131,048

(22) Filed: May 31, 2008

(65) Prior Publication Data

US 2009/0194517 A1  Aug. 6, 2009

(30) Foreign Application Priority Data

Feb. 1, 2008 (CN) .......................... 2008 1 0300316

(51) Int. Cl.
*B23K 26/36* (2006.01)
(52) U.S. Cl. ............................. 219/121.68; 219/121.84
(58) Field of Classification Search ............ 219/121.67–121.69, 121.72, 121.84
See application file for complete search history.

(56) References Cited

U.S. PATENT DOCUMENTS

| 4,303,824 | A | * | 12/1981 | Morgan et al. | 219/121.84 |
| 4,871,897 | A | * | 10/1989 | Nielsen | 219/121.67 |
| 5,220,149 | A | * | 6/1993 | Neidhardt | 219/121.67 |
| 7,616,986 | B2 | * | 11/2009 | Seibel et al. | 600/476 |
| 2004/0094526 | A1 | * | 5/2004 | McCoy | 219/121.84 |

FOREIGN PATENT DOCUMENTS

| CN | 1308941 C | 4/2007 |
| TW | 200711776 A | 4/2007 |

* cited by examiner

*Primary Examiner* — Samuel M Heinrich
(74) *Attorney, Agent, or Firm* — Altis Law Group, Inc.

(57) ABSTRACT

An exemplary laser cutting device (300) includes a laser source (40), a lens module (51), a sprayer (60), a first rotating subassembly (52), and a second rotating subassembly (53). The lens module is configured for focusing a laser beam emitting from the laser source. The first rotating subassembly is connected to the lens module and configured for driving the lens module to rotate relative to the laser source. The second rotating subassembly is rotatably connected to the lens module. The sprayer is connected to the second rotating subassembly and driven to rotate relative to the laser source by the second rotating subassembly.

17 Claims, 6 Drawing Sheets

LASER CUTTING DEVICE

BACKGROUND OF THE INVENTION

1. Field of the Invention

The present invention relates generally to laser cutting devices, more particularly to a laser cutting device with a sprayer.

2. Discussion of the Related Art

The conventional methods of cutting glass sheets is to use a diamond cutter to first to a scribe a line in the glass sheet, and then break the glass sheet by the application of an external mechanical force along the scribed line. When the glass sheet is being scored with the diamond cutter, glass fragments may be deposited on the glass and scratch it. In addition, chips can be created in the cut edge resulting in an uneven glass edge. Furthermore, the micro-cracks produced in the cut edge during the scribing process lead to reduced mechanical stress-ability, increasing the risk of breakage. An approach for preventing the formation of fragments as well as chips and micro-cracks is to cut glass sheets using thermally induced mechanical tension. In this approach, a laser beam is directed at the glass and moved at a predetermined speed relative to the glass sheet, thereby producing such a high thermal tension that cracks form in the glass sheet. Then, the glass sheet is split into pieces mechanically.

Referring to FIG. 5, a typical laser cutting device 10 used for cutting a glass sheet 20 includes a laser source 11, a focusing lens 12, and a sprayer 13. The laser source 11 faces the focusing lens 12, and the sprayer 13 is fixed to the focusing lens 12. A laser beam emitting from the laser source 11 is focused by the focusing lens 12, and forms an elliptic beam spot 111 on the glass sheet 20. In the process of cutting the glass sheet 20, the glass sheet 20 moves along the X-axis, thus keeping the major axis b of the elliptic beam spot 111 overlapping a predetermined cutting line $L_1$. Therefore, thermal energy of the elliptic beam spot 111 is symmetrically distributed along the predetermined cutting line $L_1$. Then, the sprayer 13 ejects a coolant 131 onto the glass sheet 20 to cool the area heated by the elliptic beam spot 111, creating a crack 201 in the glass sheet 20 along the predetermined cutting line $L_1$. The glass sheet 20 is split along the crack 201 by application of an external mechanical force on the glass sheet 20.

However, the laser cutting device 10 is generally fixed to a machine tool (not shown), and the sprayer 13 is fixed to the focusing lens 12. Referring to FIG. 6, if a predetermined cutting line $L_2$ is curved, the coolant 131 ejected by the sprayer 13 may deviate from the predetermined cutting line $L_2$ since the coolant 131 is always aligned along the major axis b of the elliptic beam spot 111. Therefore, all portions along the cutting line $L_2$ may not be equally cooled, leading to a reduction in cutting precision of the laser cutting device 10. Additionally, since the laser cutting device 10 is fixed to the machine tool, the major axis b of the elliptic beam spot 111 cannot be substantially aligned along a tangent T of the predetermined cutting line $L_2$, thus leading to asymmetrical distribution of the thermal energy of the elliptic beam spot 111, and a further reduction in cutting precision.

Therefore, a laser cutting device to solve the aforementioned problems is desired.

SUMMARY

A laser cutting device includes a laser source, a lens module, a sprayer, a first rotating subassembly, and a second rotating subassembly. The lens module is configured for focusing a laser beam emitting from the laser source. The first rotating subassembly is connected to the lens module and configured for driving the lens module to rotate relative to the laser source. The second rotating subassembly is rotatably connected to the lens module. The sprayer is connected to the second rotating subassembly and driven to rotate relative to the laser source by the second rotating subassembly.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present laser cutting device. Moreover, in the drawings, like reference numerals designate corresponding parts throughout the several views.

DETAILED DESCRIPTION OF THE EMBODIMENTS

Reference will now be made to the drawings to describe exemplary embodiments of the present laser cutting device, in detail.

Figure 1:
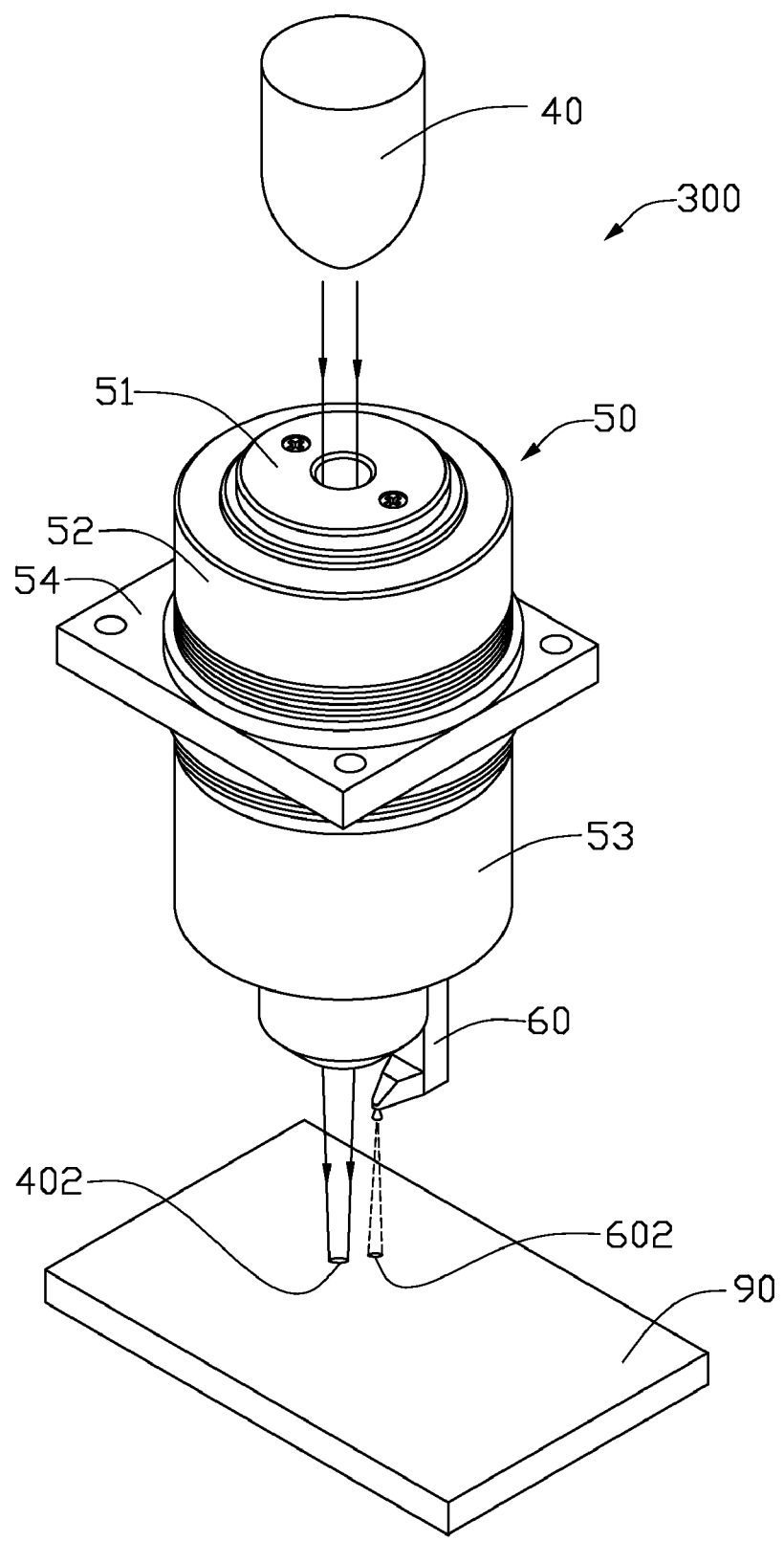
FIG. 1 is an assembled, isometric view of a laser cutting device cutting a glass sheet in accordance with a preferred embodiment of the present application.

Referring to FIG. 1, a laser cutting device 300 used for cutting a glass sheet 90 includes a laser source 40, a focusing assembly 50, and a sprayer 60. The focusing assembly 50 is arranged between the laser source 40 and the glass sheet 90. The focusing assembly 50 includes a lens module 51, a first rotating subassembly 52, a second rotating subassembly 53, and a connecting plate 54.

Figure 2:
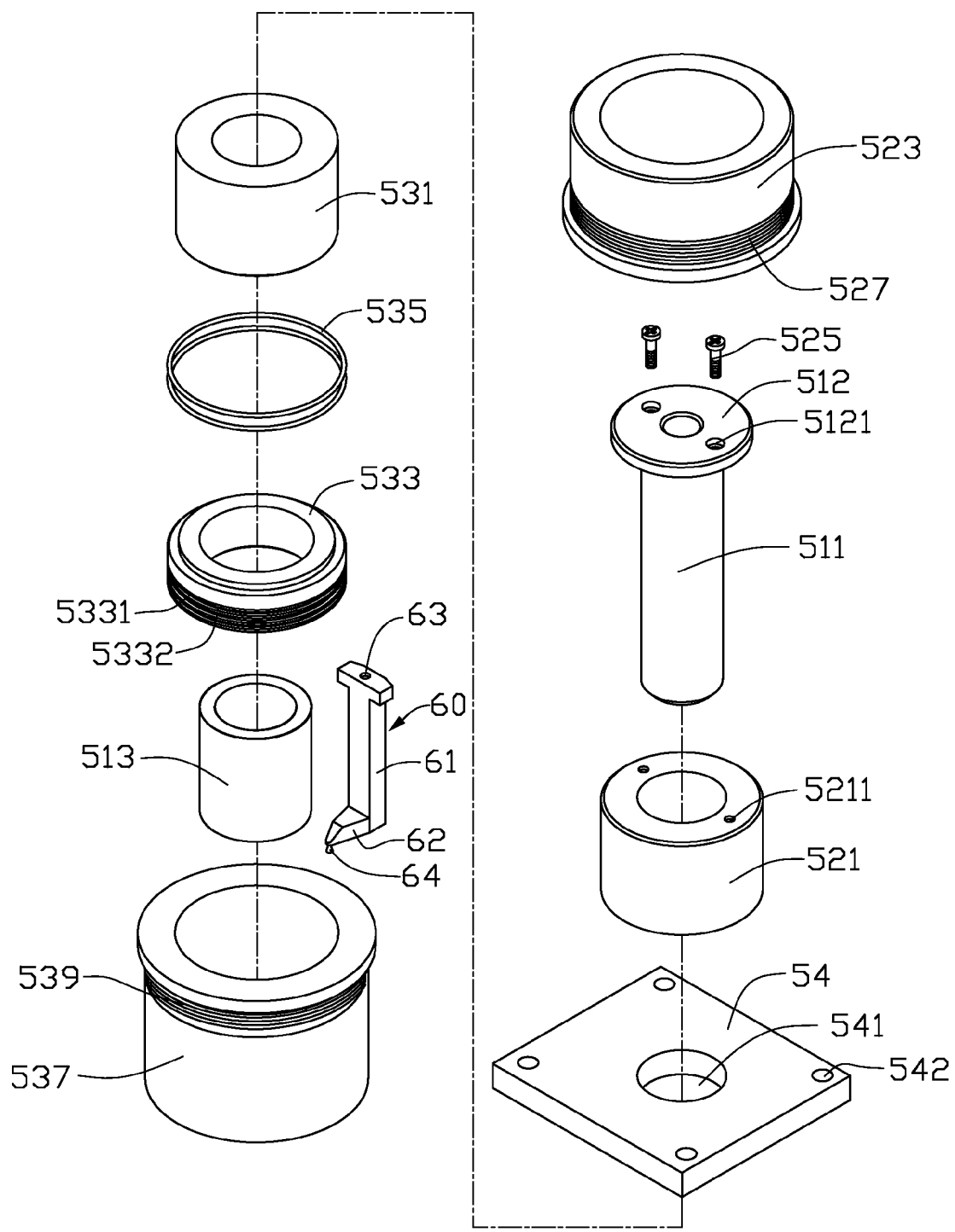
FIG. 2 is an exploded, isometric view of a focusing assembly and a sprayer of the laser cutting device of FIG. 1.
Figure 3:
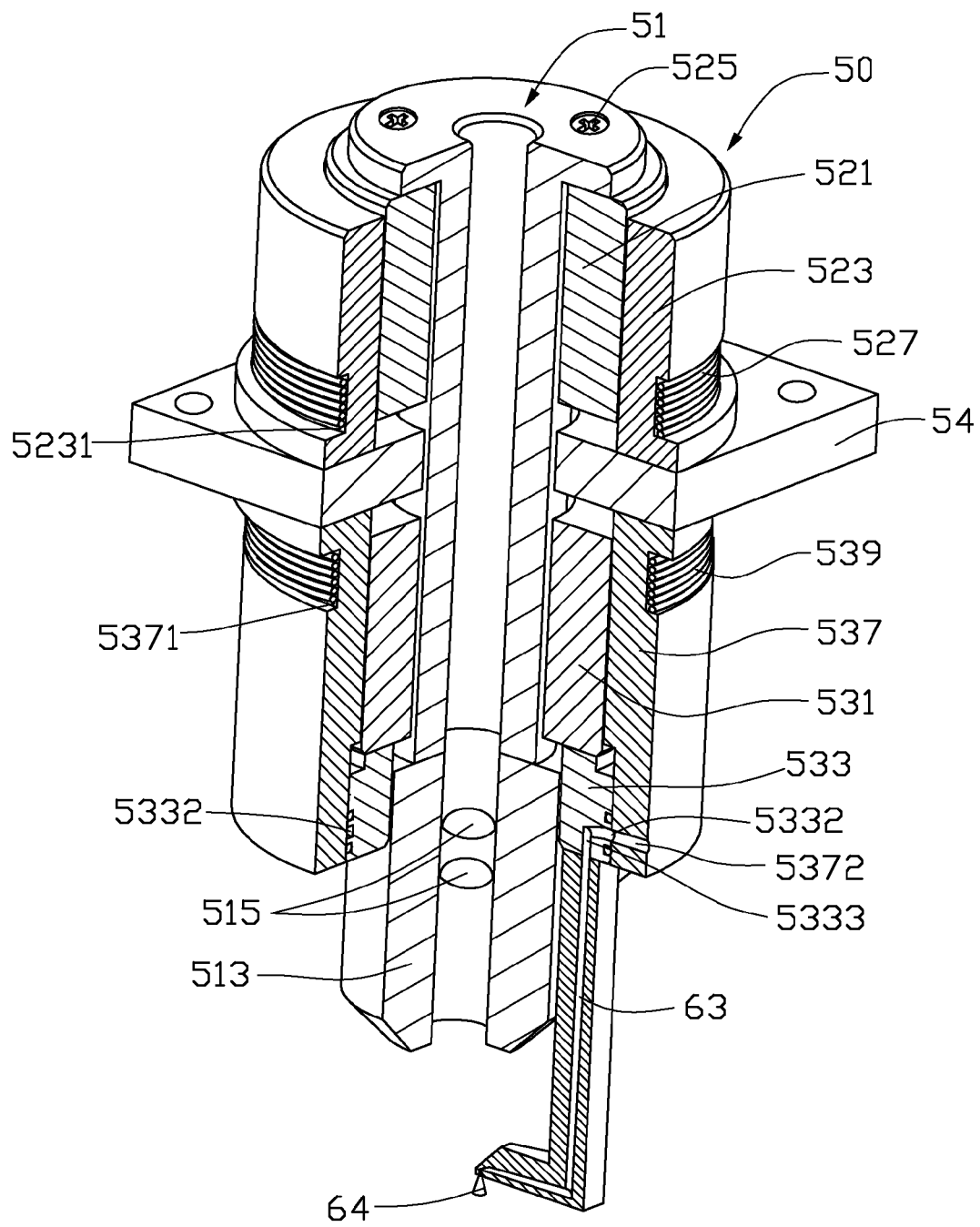
FIG. 3 is a cross-sectional, isometric view of the focusing assembly and the sprayer of FIG. 2.
Figure 4:
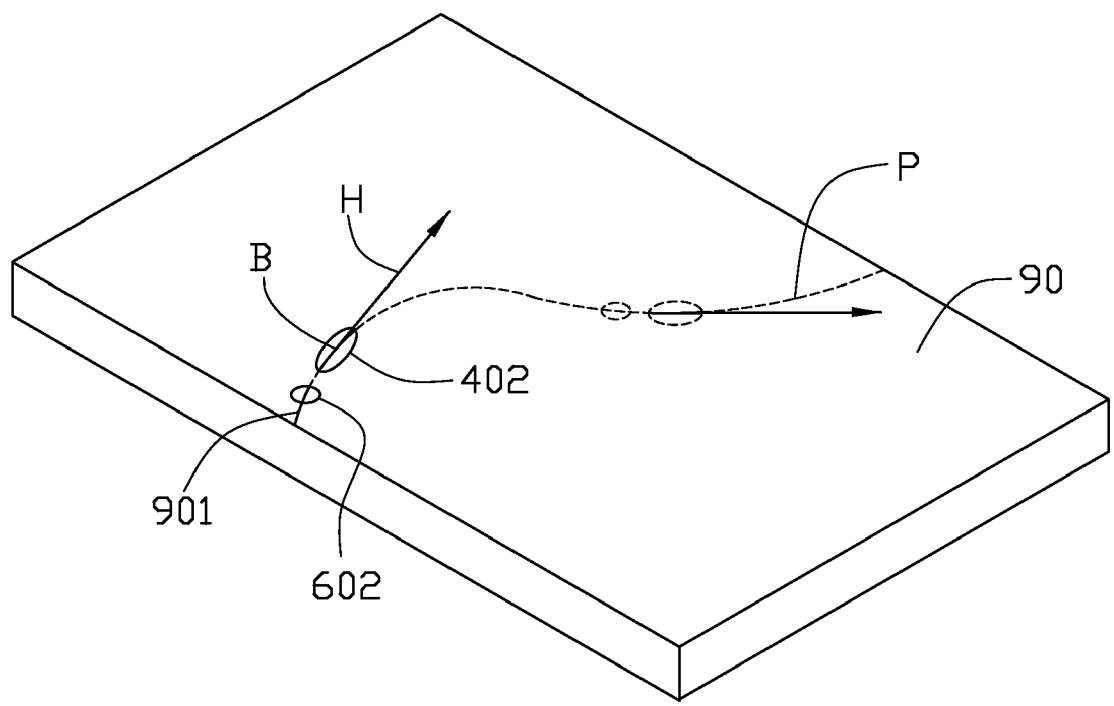
FIG. 4 is an isometric view of the glass sheet cut along a predetermined cutting curve by the laser cutting device of FIG. 1.
Figure 5:
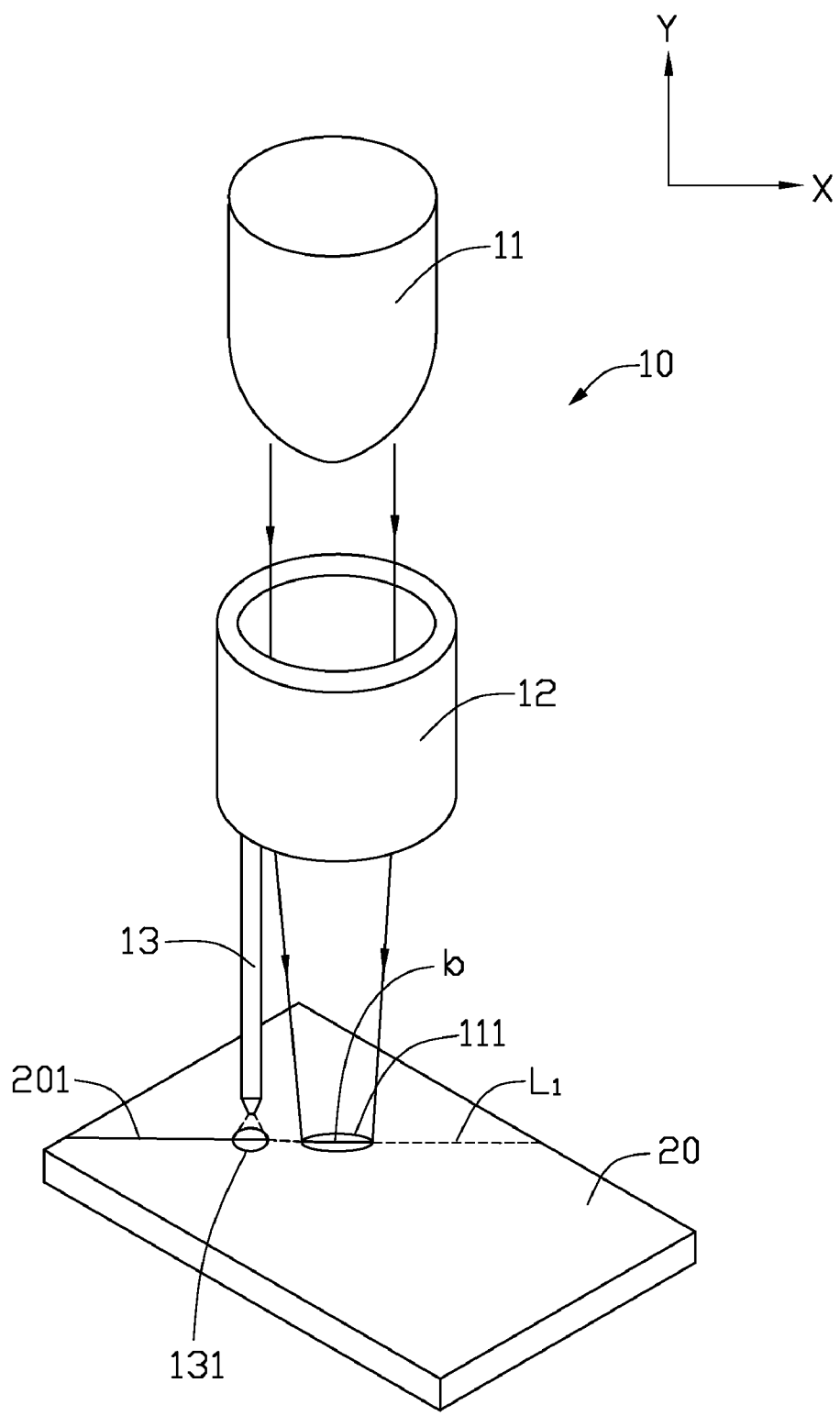
FIG. 5 is an isometric view of a conventional laser cutting device.
Figure 6:
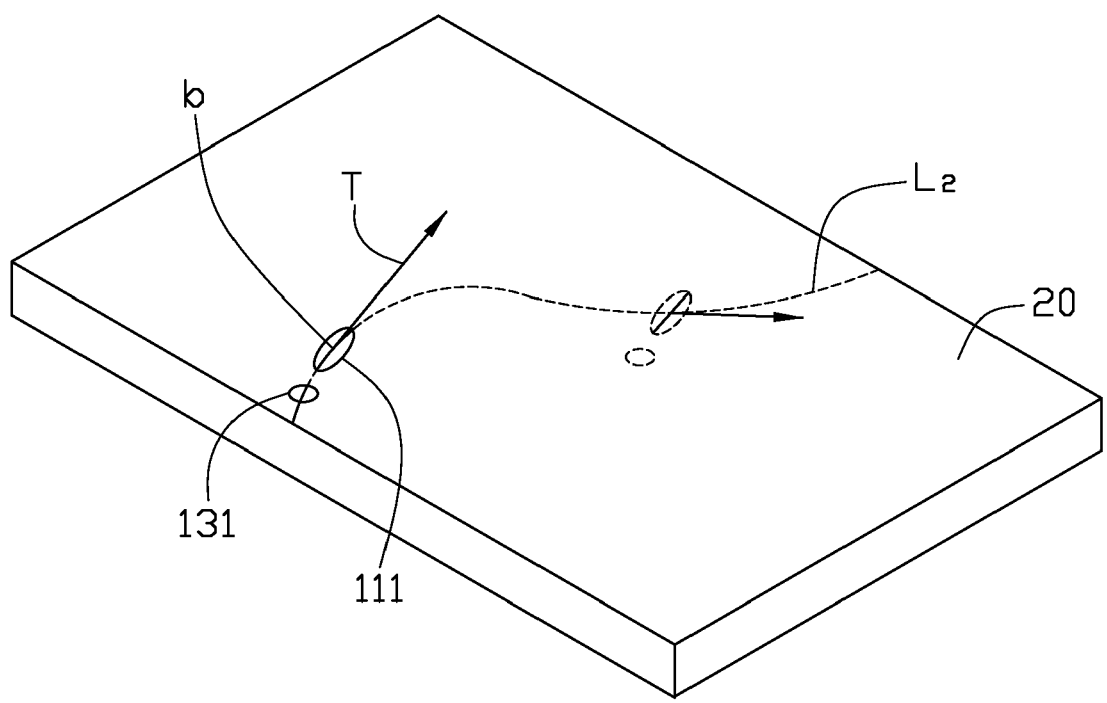
FIG. 6 is an isometric view of the glass sheet cut along a predetermined cutting line by the laser cutting device of FIG. 5.

Referring to FIGS. 1 through 3, the lens module 51 includes a cylindrical barrel 511, a lens tube 513, and a focusing lens module 515. A flange 512 is formed around one end of the barrel 511. The flange 512 defines two through holes 5121. The lens tube 513 is fixed to the other end of the barrel 511 opposite to the flange 512, and the outer diameter of the lens tube 513 is larger than that of the barrel 511. The lens tube 513 is configured for receiving the focusing lens module 515.

The first rotating subassembly 52 includes a rotor 521 and a stator 523. The rotor 521 is a hollow cylinder and is sleeved on the barrel 511 of the lens module 51. A top surface of the rotor 521 defines two assembling holes 5211 corresponding to two through holes 5121 of the flange 512. Two screws 525 extend through the through holes 5121 of the flange 512, and screw into the assembling holes 5211 correspondingly, thus fixing the rotor 521 to the lens module 51. The rotor 521 is made of conductive material, such as silicon steel. The stator 523 is sleeved on the rotor 521, and the rotor 521 is rotatable relative to the stator 523. The stator 523 defines an annular groove 5231 in the cylindrical surface. A field coil 527 is sleeved in the annular groove 5231 of the stator 523, and connected to an electrical source (not shown). When the field coil 527 is energized by the electrical source, the rotor 521 can rotate relative to the stator 523 driven by an electromagnetic force created by the field coil 527.

The second rotating subassembly 53 includes a rotor 531, a lantern ring 533, two O-rings 535, and a stator 537. The rotor 531 is a hollow cylinder and is sleeved on the barrel 511 of the lens module 51. The rotor 531 is made of conductive materials, such as silicon steel. The lantern ring 533 is substantially a hollow cylinder, and rotatably sleeved on the lens tube 513. The lantern ring 533 defines two parallel annular grooves 5331 and a annular receiving groove 5332 in the outer cylindrical surface. The annular receiving groove 5332 is between two annular grooves 5331. Two O-rings 535 are received in two annular grooves 5331 correspondingly. The lantern ring 533 also defines a channel 5333 therein, for connecting with the annular receiving groove 5332 for conveying coolant to the sprayer 60. The lantern ring 533 is welded to the rotor 531. The stator 537 is sleeved on the rotor 531 and the lantern ring 533, and the rotor 531 and the lantern ring 533 are rotatable relative to the stator 537. The stator 537 defines an annular groove 5371 in the cylindrical surface corresponding to the rotor 531. A field coil 539 is sleeved in the annular groove 5371 of the stator 537, and is connected to the electrical source. When the field coil 539 is energized by the electrical source, the rotor 531 can rotate relative to the stator 537 driven by an electromagnetic force created by the field coil 539. The stator 537 also defines a through hole 5372 for communicating with the annular receiving groove 5332 of the lantern ring 533. The external coolant can flow into the through hole 5372 via a pipe.

The connecting plate 54 is a rectangular plate. A center of the connecting plate 54 defines a positioning hole 541 for the barrel 511 of the lens module 51 to extend through. The connecting plate 54 also defines four through holes 542 in four corners respectively, for fixing the connecting plate 53 to a structure (not shown).

The sprayer 60 is fixed to a bottom surface of the lantern ring 54. The sprayer 60 defines a passage 63 therein. The passage 63 connects with the channel 5333 of the lantern ring 53. A nozzle 64 is mounted to an end of the sprayer 60 for spraying a coolant uniformly.

In assembly of the laser cutting device 300, the barrel 511 is inserted through the rotor 521, the connecting plate 54, the rotor 531, and welded to the lens tube 513. The lantern ring 533 is sleeved on the lens tube 513. The O-rings 535 are received in two annular grooves 5331 of the lantern ring 533 respectively. The stator 523 is sleeved on the rotor 521. The stator 537 is sleeved on the rotor 531, with the through hole 5372 communicating the annular receiving groove 5332 of lantern ring 533. Both the stator 523 and the stator 537 are welded to the connecting plate 54. The coolant can pass through the hole 5372 of the stator 537, the annular receiving groove 5332 and the channel 5333 of the lantern ring 533 and the passage 63 of the sprayer 60, and finally sprays out via the nozzle 64. The O-rings 535 are sleeved in the annular grooves 5331, such as to prevent the coolant from flowing out of the focusing assembly 50.

Referring to FIGS. 1 through 4, in a process of cutting the glass sheet 90 along a predetermined curved cutting path P, an short original crack 901 is formed on a surface of the glass sheet 90 with a diamond cutter. The original crack 901 overlaps a threshold of the predetermined curved cutting path P. A laser beam emitting from the laser source 40 is focused by the focusing lens module 515, so as to form an elliptic beam spot 402 on the glass sheet 90. The laser cutting device 300 moves according to the predetermined curved cutting path P. Simultaneously, the field coil 527 is provided with electric power for driving the rotor 521 to rotate, thereby driving the lens module 51 to rotate. Therefore, a major axis B of the elliptic beam spot 402 is substantially aligned along a tangent H of the predetermined curved cutting path P when the elliptic beam spot 402 moves on the glass sheet 90. That is, thermal energy of the elliptic beam spot 402 is symmetrically distributed along the predetermined curved cutting path P during the cutting process. At the same time, the field coil 539 is provided with electric power for driving the rotor 531 to rotate. The rotor 531 drives the lantern ring 533 to rotate, thus driving the sprayer 60 connected to the lantern ring 533 to rotate. Thus, a coolant stream 602 sprayed out from the sprayer 60 follows the elliptic beam spot 402, along the predetermined curved cutting path P. A crack 901 corresponding to the predetermined curved cutting path P is cooperatively formed by the elliptic beam spot 402 and the coolant stream 602. Finally, the glass sheet 90 is split along the crack 901 by application of an external mechanical force on the glass sheet 90.

Because the second rotating subassembly 53 can drive the sprayer 60 to rotate, the coolant stream 602 moves following the elliptic beam spot 402, and substantially along the predetermined curved cutting path P. In addition, since the first rotating subassembly 52 can drive the lens module 51 to rotate, the major axis B of the elliptic beam spot 402 is substantially aligned along the tangent H of the predetermined curved cutting path P, thereby leading to symmetrical distribution of the thermal energy of the elliptic beam spot 402 along the predetermined curved cutting path P. Therefore, the laser cutting device 300 has a high cutting precision.

It should be pointed out that, the lens module 51 may also be driven to rotate by other first rotating subassemblies, such as a first rotating subassembly including a motor and a belt. The belt is sleeved on the lens module 51 and a rotating axis of the motor, thus driving the lens module 51 to rotate by action of the motor. Also, the belt may be replaced by a plurality of gears. Similarly, the second rotating subassembly may be replaced by other rotating subassemblies. In addition, the lens module 51 may be made of silicon steel, so as to omit the rotor 521. When the field coil 527 is energized, the lens module 51 can be directly driven to rotate by electromagnetic force created by the field coil 527. Furthermore, the laser cutting device 300 may be applied to cut other brittle nonmetallic materials, such as ceramic substrate.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A laser cutting device comprising:
   a laser source;
   a lens module configured for focusing a laser beam emitting from the laser source;
   a first rotating subassembly connected to the lens module and configured for driving the lens module to rotate relative to the laser source, wherein the first rotating subassembly comprises a first stator, a first rotor, and a first field coil, the first rotor is fixedly sleeved on the lens module and made of conductive materials, the first stator is sleeved on the first rotor, the first field coil is sleeved on the first stator, and the first rotor is driven to rotate when the first field coil is energized, such as to drive the lens module to rotate;

a second rotating subassembly rotatably connected to the lens module; and a sprayer connected to the second rotating subassembly and being driven to rotate relative to the laser source by the second rotating subassembly.

2. The laser cutting device as claimed in claim 1, wherein the second rotating subassembly comprises a second stator and a second rotor, the second stator is sleeved on the second rotor, a second field coil is sleeved on the second stator, and the second rotor is driven to rotate when the second field coil is energized, such as to drive the sprayer to rotate.

3. The laser cutting device as claimed in claim 2, wherein the second rotor is a hollow cylinder and rotatably sleeves on the lens module.

4. The laser cutting device as claimed in claim 2, wherein the second rotating subassembly further comprises a lantern ring, the lantern ring is rotatably sleeved on the lens module and fixedly connected to the second rotor, and the sprayer is fixed to the lantern ring.

5. The laser cutting device as claimed in claim 4, wherein the lantern ring defines two annular grooves in the outer cylindrical surface, the rotating subassembly further comprises two O-rings, and the O-rings are received in the annular grooves correspondingly.

6. The laser cutting device as claimed in claim 5, wherein the lantern ring further defines a receiving groove between the two annular grooves, and a channel therein connected to the receiving groove for conveying coolant to the sprayer.

7. The laser cutting device as claimed in claim 6, wherein the second stator defines a through hole connected with the receiving groove of the lantern ring.

8. The laser cutting device as claimed in claim 6, wherein the sprayer comprises a nozzle, the sprayer defines a passage connecting the channel of the lantern ring with the nozzle correspondingly.

9. The laser cutting device as claimed in claim 1, wherein the lens module comprises a lens tube and a focusing lens module, and the focusing lens module is received in the lens tube.

10. The laser cutting device as claimed in claim 1, further comprising a connecting plate sleeved on the lens module.

11. A laser cutting device comprising:
a laser source;
a lens module configured for focusing a laser beam emitting from the laser source on nonmetallic materials, such as to heat nonmetallic materials;
a sprayer configured for spraying coolant on nonmetallic materials, such as to cool nonmetallic materials; and
a rotating subassembly connected to the sprayer and driving the sprayer to rotate, thus making the coolant substantially along a predetermined curved cutting path of nonmetallic materials, wherein the rotating subassembly comprises a stator, a rotor, and a field coil, the stator is sleeved on the rotor, the rotor is a hollow cylinder and rotatably sleeves on the lens module, the field coil is sleeved on the stator, the rotor is driven to rotate when the field coil is energized, such as to drive the sprayer to rotate.

12. The laser cutting device as claimed in claim 11, wherein the rotating subassembly further comprises a lantern ring, the lantern ring is rotatably sleeved on the lens module and fixedly connected to the rotor, the sprayer is fixed to the lantern ring.

13. The laser cutting device as claimed in claim 12, wherein the lantern ring defines two annular grooves in the cylindrical surface, the rotating subassembly further comprises two O-rings, and the O-rings are received in the annular grooves correspondingly.

14. The laser cutting device as claimed in claim 13, wherein the lantern ring further defines a receiving groove between two annular grooves, and a channel therein for connected to the receiving groove for conveying coolant to the sprayer.

15. The laser cutting device as claimed in claim 14, wherein the stator defines a through hole connecting with the receiving groove of the lantern ring.

16. The laser cutting device as claimed in claim 11, wherein the lens module comprises a lens tube, and a focusing lens module is received in the lens tube.

17. The laser cutting device as claimed in claim 11, further comprising a connecting plate, the connecting plate being sleeved on the lens module.

\* \* \* \* \*